April 25, 1939.   P. A. HOUSEMAN   2,155,971
COFFEE EXTRACT AND METHOD OF MAKING SAME
Filed May 31, 1938
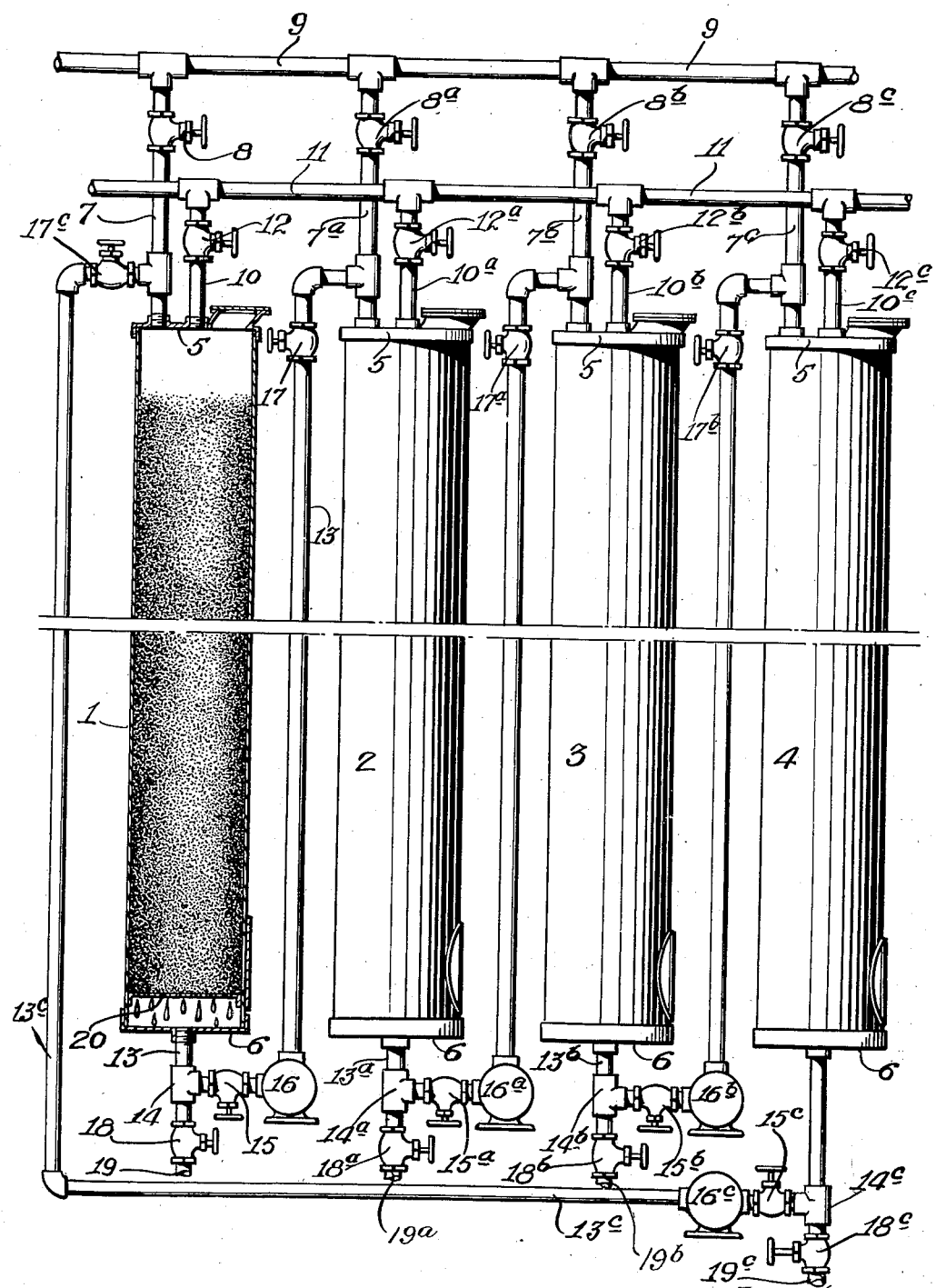

Patented Apr. 25, 1939

2,155,971

UNITED STATES PATENT OFFICE 2,155,971

COFFEE EXTRACT AND METHOD OF MAKING SAME

Percy A. Houseman, Haddonfield, N. J., assignor to MacAndrews and Forbes Company, Camden, N. J., a corporation of New Jersey Application May 31, 1938, Serial No. 210,953

17 Claims. (Cl. 99—71)

This invention relates to new and useful improvements in concentrated aqueous coffee extracts and the method of making such extracts as well as preserving the same against deterioration with age, and is a continuation in part of my copending application Serial No. 155,105, filed July 22, 1937.

As is well known the aromatic substances in roasted coffee are essentially responsible for the pleasant aroma of beverage coffee. These ingredients, commonly grouped under the name "caffeol", are highly volatile and consequently when a liquid coffee extract is concentrated by boiling or other form of evaporation at atmospheric pressure or under a vacuum, these desirable ingredients are completely or at least partially lost. This loss of the aromatic constituents of coffee is naturally most severe in extracts which are evaporated to a dry condition, and is quite substantial even in partially evaporated extracts which are thus rendered definitely inferior to beverage coffee when prepared at cup strength by the regularly-accepted methods in daily use in households, hotels and restaurants.

Various methods have been employed from time to time in an attempt to overcome this aromatic deficiency in coffee extracts and to produce a coffee concentrate which when dissolved in hot water will produce a cup of beverage coffee having the desirable aroma, taste and body. One such method consists in trapping or condensing the volatile aromatic constituents which pass off with the evaporated water and then returning these trapped or condensed aromatic constituents by one means or another to the concentrate from which they have been evaporated. Another method seeks to reduce the loss of aroma and flavor by the addition of glycerine to the extract to be evaporated in order to reduce the vapor pressure of "caffeol" by acting as a "blanket" therefor, further reduction in the loss of aromatic ingredients being sought by evaporating only a portion of the extract and then combining or mixing this evaporated or treated portion with the remainder of the original extract which has not been subjected to evaporation. Neither of these methods is, however, satisfactory since, in each, the extract or at least a substantial portion thereof is subjected to evaporation resulting in a substantial loss of the aromatic ingredients therein.

With the foregoing in mind, the principal object of this invention is to provide a novel method or process of preparing a concentrated aqueous coffee extract wherein the customary evaporation of the volatile "caffeol" is eliminated with the result that the loss in aroma and flavor afforded by the ingredients thereof is substantially eliminated.

Another object of the invention is to provide a novel method or process for producing a concentrated aqueous coffee extract of the character set forth which includes certain novel steps for preserving the coffee extract against deterioration and loss of the aromatic ingredients therein.

More particularly the invention contemplates the production of a concentrated aqueous coffee extract containing the aromatic ingredients essential to good beverage coffee and then freezing said extract into solid form for the purpose of preserving the same against deterioration and loss of said aromatic constituents due to hydrolysis, oxidation or other forms of decomposition.

These and other objects and features of the invention are set forth in detail hereinafter and shown in the accompanying drawing in which Figure 1 is a diagrammatic illustration of one form of apparatus that may be successfully used to carry out the method or process contemplated by this invention.

During the course of experiments relating to coffee extracts, I observed that when water alone at a temperature of from 60° F. to 212° F. was allowed to percolate through a relatively long column of ground roasted coffee, a concentrated percolate resulted which, when diluted with hot water to brew a cup of coffee, did not impart to that beverage the full rich flavor, aroma and body required by the accepted standards for a good cup of coffee because, while the water furnished the necessary solvent action for the water-soluble solids of the coffee, the volatile aromatic constituents thereof were not driven off, with the result that the coffee was somewhat flat and deficient in the proper proportion of aroma and bitterness. On the other hand, I also observed that when steam alone is caused to pass through a similar column of ground roasted coffee, while the aromatic constituents thereof are driven off, the steam does not furnish the necessary solvent action for the water-soluble solids of the coffee bean.

With these observations in mind, the present invention consists essentially in the discovery that by passing steam and water simultaneously through a column of ground roasted coffee under such conditions of control and regulation as will obtain a simultaneous steam distillation of volatile aromatic constituents and solution of water-soluble solids, the resulting fractions when removed together from the cylinder, provide an extract so blended as to contain all of the desirable constituents necessary to a coffee concentrate which when diluted with hot water to make a cup of coffee produces a beverage of fine and true flavor having full body and aroma.

Referring now to the drawing, one form of apparatus which may be employed to carry out my invention comprises a plurality of vertically arranged extracting columns or cells designated 1, 2, 3 and 4 respectively, and preferably insulated and constructed of heat resistant glass, or other material resistant to corrosion by the coffee extract. The upper and lower ends of each cell are normally closed by means of suitable caps or cover elements 5 and 6 respectively provided with a suitable number of openings therethrough to receive one or more tubes or pipes and permit charging and discharging of said cells. As shown a pipe 7 having a control valve or the like 8 therein extends into the top of the cell 1 through an opening in the cap 5 and has its other end connecting with a hot water supply line 9. In a similar manner, pipes 7a, 7b and 7c lead respectively from the main water line 9 into the upper ends of cells 2, 3 and 4, and these pipes as in the case of pipe 7 are provided with valves 8a, 8b and 8c, respectively, for controlling the flow of hot water from the said line 9 to the several cells 2, 3 and 4.

Also extending into the upper end of the cell 1 through another opening in the cap or cover 5 is a pipe 10 which leads from a main steam line 11 and is provided with a valve or the like 12 therein for controlling the flow of steam from said line 11 to the cell 1. In similar manner pipes 10a, 10b and 10c lead respectively from the main steam line 11 into the upper ends of the cells 2, 3 and 4 and these pipes, as in the case of the pipe 10, are provided with valves 12a, 12b and 12c respectively for controlling the flow of steam from the said line 11 to the several cells 2, 3 and 4.

Extending into the lower end of the cell 1 through an opening in its closure 6 is an outlet pipe 13 which leads through a T section 14, valve 15, rotary pump 16 and upwardly through a second valve 17 from which it connects into the hot water pipe line 7a below the valve 8a located therein, said pump 16, as well as pumps 16a, 16b and 16c hereinafter mentioned, being of such designed capacity as will take care of the volume of liquid extracted from each cell including water and condensed steam. In similar manner, each of the cells 2 and 3 are provided with pipes 13a and 13b respectively which lead from the lower end of such cell through T sections 14a and 14b, valves 15a and 15b, rotary pumps 16a and 16b and upwardly through other valves 17a and 17b into the pipe lines 7b and 7c leading into the upper end of the next succeeding cell 3 or 4 as the case may be, and a pipe 13c having suitable control valves 15c and 17c therein, as well as a rotary pump 16c leading from the lower end of the cell 4 through a T section 14c back to the fresh water feed line 7 leading from the main 9 into the upper end of the cell 1. For the purpose of permitting the apparatus to be tapped after or at each stage thereof, each of the T sections has its downwardly extending branch connected through suitable taps or valves 18, 18a, 18b and 18c to an exhaust pipe or nipple 19, 19a, 19b and 19c respectively.

In carrying out the method of my invention, suitable quantities of freshly roasted, ground coffee are placed in each of the cells 1, 2, 3 and 4 and these columns of coffee are supported at their lower end in spaced relation to the outlet pipes 13, 13a, 13b and 13c by means of suitable perforated plates or screens 20 of such construction that the ground coffee will not pass therethrough although liquid will be permitted to do so. Steam at a suitable pressure is then allowed to pass into the top of the cell 1 from the steam line 11 through the pipe 10 and when the steam has passed a predetermined distance down the column of coffee therein, hot water at a suitable temperature is similarly admitted to the top of the cell 1 through pipe 7, the flow of steam and hot water being controlled by the valves 12 and 8 in conjunction with suitable metering devices such as an orifice or the like (not shown) to regulate the arrival of the steam which distills off the volatile aromatic constituents and condenses and the water which dissolves and picks up the soluble solids, with respect to each other, at the bottom or lower end of the column of coffee in the cell 1. The proportions of steam to water and the rate of flow of each may be regulated to further control the temperature and density of the coffee extract collected at the bottom or lower end of the cell 1 below the column of coffee therein.

The distillate and solution fractions thus produced collect and combine during passage through the column of coffee within the cell 1 and the resulting extract passes out of said cell 1 through the outlet pipe 13 from which it is withdrawn through the tap 18 therein so long as its density does not fall below a given density. When, however, the density of the extract does fall below such given density, the tap 18 is closed so that the remainder of the extract which is of lighter density will be pumped through the pipe 13 and be admitted into the top of the second cell 2 through pipe 7a either alone or together with fresh water from the main 9, control being effected by means of the valve 8a in said pipe 7a. However, prior to admission of this hot water and/or lighter density extract to the cell 2, steam is admitted into the top thereof from the line 11 through the pipe or tube 10a so that the said steam may pass a predetermined distance down the column of coffee in the cell 2 before water and/or lighter density extract are admitted thereto.

As previously described in connection with the cell 1, the extract produced is collected at the lower end of the cell 2 after which it is drawn off from the outlet pipe 13a through the tap 18a until the density of the extract falls below that desired at which time said tap 18a is closed and the remainder of the extract which is of lighter density is pumped through said outlet pipe 13a into the upper end of the cell 3 wherein the processes and steps described in conjunction with cells 1 and 2 are repeated, the low density portion of the extract, after withdrawal through the tap 18b of that portion having a density not less than that desired, being pumped into the top of cell 4 in which the steps previously described in conjunction with cells 1, 2 and 3 are again repeated except that the lighter density extract, after withdrawal through the tap 18c of extract having a given density or greater, may or may not be returned through the outlet pipe 13c back into the fresh feed water line 7 for recirculation in one or more stages of the apparatus after the cells have been recharged with a fresh supply of freshly roasted, ground coffee of good quality. In this manner the battery of cells 1, 2, 3 and 4 may be operated continuously and when it is necessary to recharge any one cell with ground roasted coffee such cell may be shut off from the remaining cells by appropriate manipulation of the several valves 15, 15a, 15b or 15c and 17, 17a, 17b or 17c as the case may be, thus permitting extraction to continue uninterrupted in the remaining cells.

By way of more specifically illustrating the control and regulation of the steam and hot water admitted to the several cells as regards the respective rates of flow of each, the pressure of the former and the temperature of the latter, I have found that generally satisfactory results are obtained, in the case four pounds of freshly roasted, ground coffee are placed in cells three inches in internal diameter and sixty inches high, when steam is admitted at a uniformly controlled pressure of approximately three pounds gauge and at a rate of flow regulated to approximately 0.12 ounce per minute. The hot water on the other hand is admitted to each cell at a regulated rate of flow of approximately 5.0 ounces per minute and at a uniformly controlled temperature of 200° F., said hot water being admitted to the cells when the initially admitted steam has travelled substantially two-thirds of the way down the columns of coffee therein so that the hot water and steam extracts will arrive at the bottom or lower end of said columns of coffee at approximately the same time. The extract collecting at the lower end of the cells below the columns of coffee therein has a temperature of approximately 200° F. and the extract thus produced during the first portion of the treatment has a density of 16° Twaddell or greater (measured at 70° F.) which is generally the density desired, and is removed through valves 18, 18a, 18b and 18c, respectively. Extracts of lower density are usually pumped to the top of the next succeeding still.

The temperature at which the fresh feed water is admitted to the several cells as well as the pressure of the steam admitted thereto, may, of course, vary widely and a satisfactory extract is generally obtained by employing water at temperatures of from 100° F. to 212° F., and steam at from one pound to twenty pounds gauge pressure in suitable proportions and under such control as respects rate of flow and admission to give the resulting extract a predetermined temperature and Twaddell density. Other than the specific example given in the preceding paragraph, these variables cannot be definitely fixed or correlated with respect to one another except by test and experimentation based upon conditions employed and density desired in the extract to be produced. The temperature within the several cells may be further controlled to secure the proper equilibrium between the distillation and extraction phases by providing said cells with externally arranged heated jackets or any other means capable of controlling the temperature interiorly thereof.

In some instances, depending upon various factors and particularly the blend and degree of roasting of the coffee employed in making the extract, I have found that the initial portion of the extract produced has a decided objectionable odor and a sour or acid taste which is imparted to said extract by the volatile constituents in the coffee initially distilled off by the steam which is passed off therethrough and in such cases I may eliminate such objectionable odor and taste from the extract by controlling the times of admission and rates of flow of steam and hot water through the columns of ground roasted coffee so that the steam arrives at the lower end or bottom of such column slightly ahead of the hot water, thus permitting withdrawal and discard or rejection of the initial portion of the steam distillate before the true extract consisting of the combined steam distilled volatile constituents and water soluble solids arrives at the outlet. The quantity of steam distillate discarded in a given case may vary widely and is best determined in each case by the taste and smell of said distillate during the initial states of the operation or process.

On the other hand and in lieu of discarding the initial portion of steam distillate I may correct the aforementioned objectionable smell and acid taste of the extract and otherwise adjust or control the pH or acidity thereof by the use of calcium carbonate in either powdered granular or other form which may be distributed through the column of ground coffee or concentrated in the form of a layer at the bottom thereof, and while the percentage of calcium carbonate required in a given case may vary widely, percentages from 0.1% to 5.0% calculated on the weight of the ground roasted coffee bean generally afford satisfactory adjustment and control of the acidity of the extract. In lieu of employing either one of the procedures mentioned for eliminating objectionable odor and taste in the extract, it will be obvious, of course, that they may be employed simultaneously and in conjunction with one another.

In order to preserve the coffee extract thus produced against deterioration with age and loss of the aromatic constituents therein which result from the action of hydrolysis, oxidation or other decomposition, said concentrated extract is preferably frozen solid immediately or as soon as possible after it is withdrawn from the several cells through the taps 18, 18a, 18b and 18c preferably to a cooling tank or chamber (not shown). The freezing point of the liquid extract or concentrate is somewhat below 32° F. Superior results, however, generally are obtained when a temperature of 0° F. or lower is employed and the frozen product is maintained and stored at or near this temperature until delivered to the ultimate consumer. Any well known refrigerant or system of refrigeration may be employed to freeze the liquid extract, and for example, a satisfactory product may be produced by freezing such extract in solid carbon dioxide (dry ice) which in addition to its rapid freezing properties, is readily adaptable to packaging and storing of the product. By freezing the liquid coffee extract or concentrate as described, the water content thereof is in the solid phase and no appreciable hydrolysis, oxidation or other decomposition occurs.

While the illustrated form of apparatus for carrying out the present invention contains four stages or cells, it is pointed out and should be obvious that the said invention may be effectively practiced by employing a single or any other number of cells, but for economy and continuity of operation, it is preferred that a plurality of such stages or cells be employed. Furthermore, while a specific example of the invention has been herein set forth for descriptive purposes, it is not intended that said invention be precisely limited thereto but that changes, variations and modifications may be incorporated and embodied herein within the scope of the annexed claims.

I claim:

1. The method of making concentrated aqueous coffee extract which comprises subjecting the ground roasted coffee to the combined action of steam to distill the aromatic ingredients therefrom and of hot water water to effect a solution of the water-soluble solids therein, combining the condensed distillate and said solution and thereafter removing the combined extract from the ground coffee.

2. The method as claimed in claim 1 wherein calcium carbonate is associated with the ground roasted coffee for the purpose of adjusting the pH of the extract produced.

3. The method of making concentrated aqueous coffee extract which comprises passing steam and hot water downwardly through an enclosed column of ground roasted coffee to distill the aromatic ingredients therefrom and to effect a solution of the water-soluble solids therein, and collecting the combined extraction products at the lower end of said column of coffee.

4. The method as claimed in claim 3 wherein calcium carbonate is associated with the ground roasted coffee for the purpose of adjusting the pH of the extract produced.

5. The method as claimed in claim 3 wherein a layer or thickness of calcium carbonate is provided at the lower end of the column of coffee for the purpose of adjusting the pH of the extract produced, the percentage of said calcium carbonate being not in excess of 5% by weight of the coffee.

6. The method of making concentrated aqueous coffee extract which comprises passing steam and hot water downwardly through an enclosed column of ground roasted coffee to distill the aromatic ingredients therefrom and to effect a solution of the water-soluble solids therein, collecting the combined extraction products at the lower end of said column of coffee, and respectively regulating the pressure and temperature of said steam and water during passage thereof through the coffee to control the temperature and density of the extract produced by such combination of said distillate and solution fractions.

7. The method as claimed in claim 6 wherein calcium carbonate is associated with the ground roasted coffee for the purpose of adjusting the pH of the extract produced.

8. The method as claimed in claim 6 wherein a layer or thickness of calcium carbonate is provided at the lower end of the column of coffee for the purpose of adjusting the pH of the extract produced, the percentage of said calcium carbonate being not in excess of 5% by weight of the coffee.

9. The method of making concentrated aqueous coffee extract which comprises passing steam and hot water downwardly through an enclosed column of ground roasted coffee to distill the aromatic ingredients therefrom and to effect a solution of the water-soluble solids therein, controlling the relative proportions and rates of flow of said steam and hot water so that the same initially reach the lower end of the column of coffee at substantially the same time, collecting the combined extraction products at the lower end of said column of coffee, and respectively regulating the pressure and temperature of the steam and water during passage thereof through the coffee to control the temperature and density of the extract produced by such combination of said distillate and solution fractions.

10. The method of making concentrated aqueous coffee extract which comprises passing steam and hot water downwardly through an enclosed column of ground roasted coffee to distill the aromatic ingredients therefrom and to effect a solution of the water-soluble solids therein, collecting the combined extraction products at the lower end of said column of coffee, respectively regulating the pressure and temperature of said steam and water during passage thereof through the coffee to control the temperature and density of the extract produced by such combination of said distillate and solution fractions, withdrawing so much of said extract as has not less than a predetermined density, and passing the remainder of said extract downwardly through a second enclosed column of ground coffee together with hot water and steam to produce an additional quantity of extract by the distillation of the aromatic ingredients and solution of the water-soluble solids therein as described.

11. The method of making concentrated aqueous coffee extract which consists in passing steam and hot water downwardly through a plurality of enclosed columns of ground roasted coffee for the purpose of distilling off the aromatic ingredients and effecting a solution of the water-soluble solids therein, collecting the combined extraction products at the lower end of each of said columns of coffee, respectively regulating the pressure and temperature of said steam and water during passage thereof through the several columns of coffee to control the temperature and density of the extract produced by such combination of said distillate and solution fractions, withdrawing so much of the extract collected below each column of coffee as has not less than a predetermined density, and passing the remainder of said extract downwardly through another of said columns of coffee together with steam and hot water to form an extract therefrom.

12. The method of making concentrated aqueous coffee extract which comprises passing steam and hot water downwardly through an enclosed column of ground roasted coffee to distill the aromatic ingredients therefrom and to effect a solution of the water-soluble solids therein, controlling the relative proportions and rates of flow of said steam and hot water so that steam reaches the lower end of the column of coffee in advance of the hot water to initially distill off certain objectionable ingredients in the coffee, discarding said initial steam distillate, and thereafter collecting the combined succeeding steam distillate and the water soluble solids at the lower end of said column of coffee.

13. The method of making concentrated aqueous coffee extract which comprises passing steam and hot water downwardly through an enclosed column of ground roasted coffee to distill the aromatic ingredients therefrom and to effect a solution of the water-soluble solids therein, controlling the relative proportions and rates of flow of said steam and hot water so that steam reaches the lower end of the column of coffee in advance of the hot water to initially distill off certain objectionable ingredients in the coffee, discarding said initial steam distillate, and thereafter collecting the combined succeeding steam distillate and the water soluble solids at the lower end of said column of coffee, and respectively regulating the pressure and temperature of the steam and water during passage thereof through the coffee to control the temperature and density of the extract produced by such combination of said distillate and solution fractions.

14. The method as claimed in claim 12 wherein calcium carbonate is associated with the ground roasted coffee to aid in correcting the acidity of the extract produced.

15. The method of making concentrated aqueous coffee extract which comprises passing steam and hot water downwardly through an enclosed column of ground roasted coffee to distill the aromatic ingredients therefrom and to effect a solution of the water-soluble solids therein, controlling the relative proportions and rates of flow of said steam and hot water so that steam reaches the lower end of the column of coffee in advance of the hot water to initially distill off certain objectionable ingredients in the coffee, discarding said initial steam distillate, and thereafter collecting the combined succeeding steam distillate and the water soluble solids at the lower end of said column of coffee, withdrawing so much of the extract produced as has not less than a predetermined density, and passing the remainder of said extract downwardly through a second enclosed column of ground coffee together with hot water and steam to produce an additional quantity of extract by the distillation of the aromatic ingredients and solution of the water-soluble solids therein as described.

16. The method of making concentrated aqueous coffee extract which comprises passing steam and hot water downwardly through an enclosed column of ground roasted coffee to distill the aromatic ingredients therefrom and to effect a solution of the water-soluble solids therein, controlling the relative proportions and rates of flow of said steam and hot water so that steam reaches the lower end of the column of coffee in advance of the hot water to initially distill off certain objectionable ingredients in the coffee, discarding said initial steam distillate, collecting the combined succeeding steam distillate and the water soluble solids at the lower end of said column of coffee, withdrawing so much of the extract produced as has not less than a predetermined density, passing the remainder of said extract downwardly through a second enclosed column of ground coffee together with hot water and steam to produce an additional quantity of extract by the distillation of the aromatic ingredients and solution of the water-soluble solids therein as described, and controlling the relative proportions and rates of flow of said steam and hot water so that the former reaches the lower end of the column of coffee in advance of the hot water to initially distill off certain objectionable ingredients in said coffee.

17. The method as claimed in claim 15 wherein calcium carbonate is associated with the ground roasted coffee to aid in correcting the acidity of the extract produced.

PERCY A. HOUSEMAN.